United States Patent [19]

Flannelly et al.

[11] Patent Number: 4,894,787
[45] Date of Patent: Jan. 16, 1990

[54] AUTOMATIC LOAD MONITORING SYSTEM WITH REMOTE SENSING

[75] Inventors: William G. Flannelly, South Windsor; Clifford T. Gunsallus, North Canton, both of Conn.; George F. Lang, Glen Rock, N.J.

[73] Assignee: Kaman Aerospace Corporation, Bloomfield, Conn.

[21] Appl. No.: 187,227

[22] Filed: Apr. 28, 1988

[51] Int. Cl.⁴ .............................................. G01M 7/00
[52] U.S. Cl. ................................... 364/508; 364/550; 340/665; 340/683; 73/577; 73/583
[58] Field of Search .............................. 364/508, 550; 416/134 A, 140; 340/665, 671, 672, 603, 615; 73/118, 574, 579, 583, 455, 1 R, 10 V, 577, 660

[56] References Cited

U.S. PATENT DOCUMENTS

| | | | |
|---|---|---|---|
| 4,345,472 | 8/1982 | Hara et al. | 364/508 |
| 4,485,678 | 12/1984 | Flanuele | 364/508 |
| 4,722,062 | 1/1988 | Breitkopf et al. | 364/508 |
| 4,758,964 | 7/1988 | Bittner et al. | 364/508 |
| 4,764,882 | 8/1988 | Braschel et al. | 364/508 |

Primary Examiner—Parshotam S. Lall
Assistant Examiner—Brian M. Mattson
Attorney, Agent, or Firm—McCormick, Paulding & Huber

[57] ABSTRACT

A novel system for determining the magnitudes of loads on rotating helicopter components from signals remotely measured on the helicopter fuselage is characterized by a processor which decomposes the measured signals into corresponding Fourier components and extracts selected components therefrom. A programming module performs a multiplication on the respective Fourier components to correlate the measured components with corresponding determinative parameter values. The parameter values are established in a calibration process which is characterized by determination of the independent values of a measured signal set using a Jones orthogonalization process. The signals output from the coefficient programming module are provided to a multiplying resolver which receives synthesized reference sinusoids from a digital processor and generates time dependent signal components therefrom. These signals are ultimately summed in an analog summer circuit whose output signal corresponds to the desired parameter signal.

32 Claims, 9 Drawing Sheets

AUTOMATIC LOAD MONITORING SYSTEM WITH REMOTE SENSING

TECHNICAL FIELD

This invention relates to load monitoring devices and relates more particularly to automatic load monitoring systems having remote sensing.

BACKGROUND OF THE INVENTION

Systems for monitoring force loads are well known and are used with a variety of products to determine structural conditions in mechanical components. These systems are characterized by a plurality of parameter sensors, such as strain gauges, which are positioned locally with the mechanical elements and provide signals to a remote processor. The measured data is correlated by the processor in accordance with a pre-established relationship. The processor output signals are indicative of the stress or loading conditions of the elements.

In many applications, the direct instrumentation of mechanical elements is possible. For example, strain gauges and sensors can easily be positioned locally on an airplane's wings and aerilons, with signals from the sensors conventionally routed to a remote cockpit processor. However, for some elements, such as rotating turbine blades in a jet engine, direct instrumentation is impossible or impractical. Another such example is a rotating helicopter blade. Direct instrumentation of the blade with locally positioned sensors can only be accomplished by employing a sophisticated slip ring apparatus which is prone to wear and must therefore be maintained on a frequent basis. As a result, remote blade mounted instrumentation is configured with a helicopter only for purposes of initial testing and calibration.

Techniques for indirectly measuring structural parameters of loaded mechanical elements have also been explored. With these techniques, sensors are remotely positioned from the loaded components of interest. For example, in an airplane, a plurality of sensors can be positioned on the aircraft body. The signal received at these sensors comprises a component due to the loading of the airplane body, as well as a component indicative of the loads on the aircraft wings. Using pre-determined relationships, a processor could ideally isolate the strain information from the element of interest and correlate that data to the loading of the element. To date, no system has demonstrated a consistent capability of extracting desired loading information using signals from remotely positioned sensors.

Determining the signal component output loads on helicopter elements are additonally more since the loads imposed upon the various rotating elements are periodic. Systems which have attempted to remotely determine structural parameters in the rotating elements of a helicopter, such as blade strains or moments, have been unsuccessful because the mathematical computations required have been deemed too complex and that the requisite data is insufficiently measurable. It would be desirable to have a system which remotely senses loads on structural elements of a mechanical system and would establish correlation between measured parameters and desired values using matrix methods for corelative regression and information processing in reealtime, with a minimal sensor signal input generating a fixed data stream. The present invention is drawn towards such a system.

SUMMARY OF THE INVENTION

An object of the present invention is to provide for a system that determines the magnitude of an element parameter from signals sensed remote from that element.

Another object of the present invention is to provide an electrical circuit which provides, in response to a received periodic signal, a signal locked thereto with phase synchronization.

A specific object of the present invention is to provide a helicopter recording system that determines, from signals measured on the helicopter fuselage, values of parameters for the rotating helicopter blades.

According to the present invention, a method of generating, from signals measured in a first element indicative of a first element parameter, associated signals indicative of a corresponding determinative parameter in a cooperative second element; the method includes the steps of measuring signals indicative of the first element parameter, measuring signals in the second element, including those signals indicative of corresponding determinative parameters, computing from the first signal set an independent signal subset thereof, and generating from the independent first signal subset and the second signal set, signals correlating the measured signal sets.

According to another aspect of the present invention, an electronic phase synchronization circuit includes means for receiving a periodic timing signal and a controller. The controller receives the periodic timing signal and provides, for a select numbers of time during the timing signal. A control signal to a first circuit that generates first and second periodic signals. The first circuit control signals selectively enable the first circuit to output one of the first or second periodic signals. The controller also provides control signals to a second circuit that receives the selected and periodic signal. The second circuit control signals enable the second circuit to process the periodic first circuit signal present thereto, thereby synthesizing the phase of the first and second periodic signals with the timing signal.

According to another aspect of the present invention, a system for determining the value of parameter in a first element includes a measuring device for measuring signals in a second element that cooperates with the first element.

DESCRIPTION OF THE PREFERRED EMBODIMENT

Figure 1:
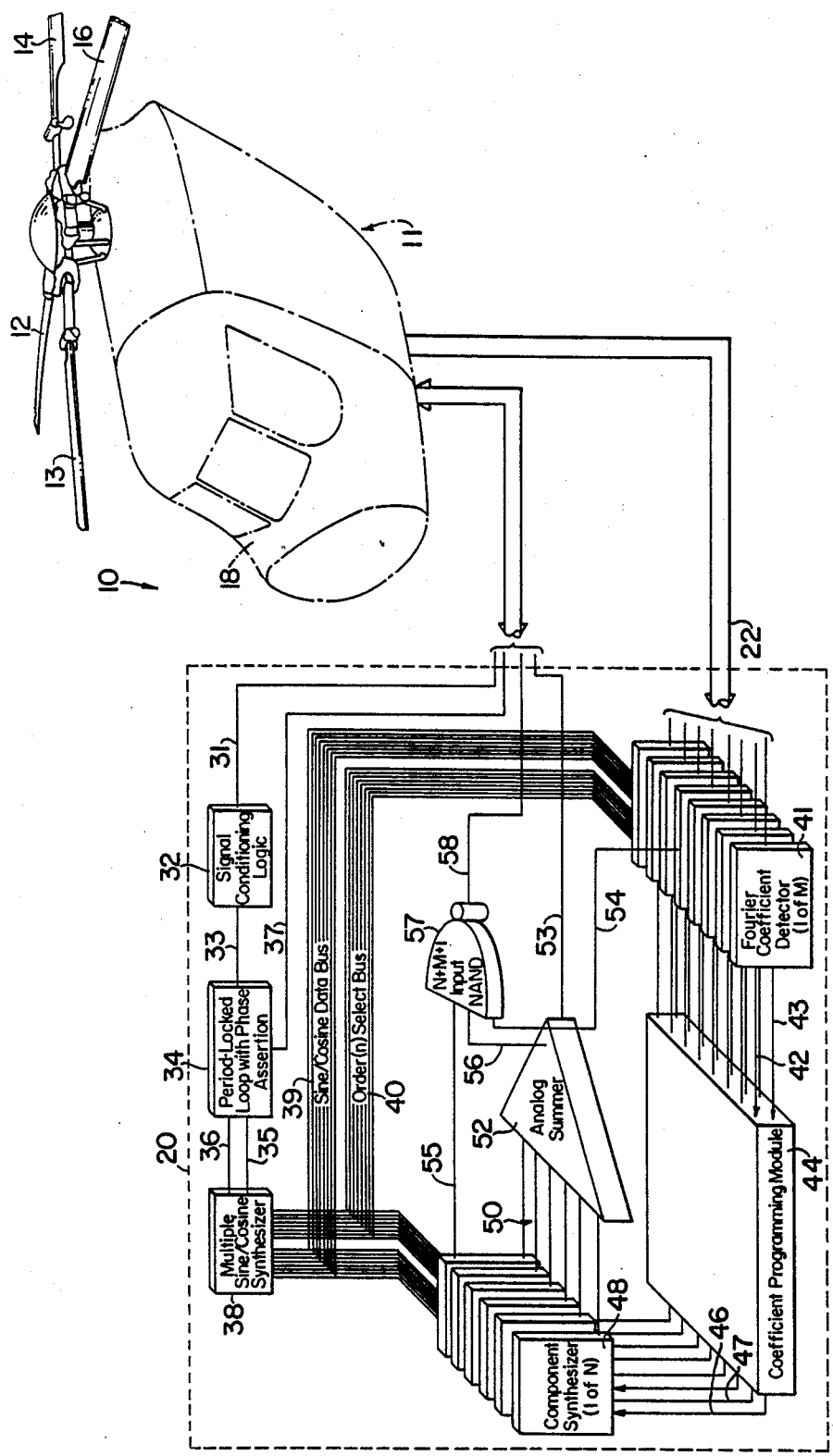
FIG. 1 is a simplified schematic diagram illustrating a portion of an automatic load and monitoring and recording system (HALMARS) provided according to the present invention adapted for use with a helicopter.

Referring now to FIG. 1 there is illustrated a portion of a system 10 which is used with a Helicopter Automatic Load and Monitoring Recording Sysem (HALMARS) provided according to the present invention. For the rotating mechanical systems of the helicopter, it is most often not physically possible or desirable to locally obtain parameter data, for example by positioning stress-strain gauges on a rotating helicopter blade to determine edgewise blade bending moments. The system of FIG. 1 determines a desired parameter (i.e., load) by means of indirect measurements taken remote from the rotating components. The process of determining physical parameters of a dynamic element from only a few localized operational measurements has been named a "holometric" process, from the Greek "holos" (the whole) and "metricus" (to measure).

As an example, helicopter 11 shown in phantom has rotating blades 12, 13, 14 and 16 which are characterized by rotor blade bending strains or loads resulting from corresponding rotor blade bending moments. These moments are determined from strains measured on fuselage 18. Controller 20 receives a plurality of analog input data signals, such as the eight data lines indicated schematically at 22, that extend from a corresponding plurality of "monitor" transducers indicated schematically at 28 are located on the fuselage or the "fixed" system of the helicopter. It is advantageous for the transducers or sensors in the fixed system to be strain gauges or similar instruments. These transducers are placed preferably along load paths or stations in the airframe (fuselage). The process of determining the number of required monitor transducers and their placement is described hereinafter.

During flight, the helicopter rotor blades experience strains or bending moments at various stations or positions which vary with the flight condition. Such flight conditions would include, for example, a high g-load in the pullout from a dive, lower than gravity g-load in a pushover maneuver, hover, or high speed flight. In each flight condition or maneuver, the motions of the rotor blades differ from the motions in other flight conditions or maneuvers both in magnitude and phasing in a highly significant manner.

Each of the transducer signals can be decomposed by conventional Fourier analysis to generate a series of real and imaginary time independent signal components. As detailed hereinafter, it has been determined that only the zeroth and Nth harmonic or Nth Fourier signal component (N/rev.) in a helicopter with N rotor blades (for N greater than 2) is needed to fully describe the loads on the helicoper rotating system (i.e., the helicopter blades). Those skilled in the art will note that the zeroth harmonic may sometimes be ignored for blade vibratory loads only. Therefore, for each flight condition or maneuver, a relationship can be determined between the strains measured by the monitors (sensors) and the corresponding strain or bending moment in the rotor. Although it has been determined that use of only the (steady) zeroth and Nth harmonic produces guite satisfactory results using the present holometric process with monitors in the fuselage for strains and bending moments on a helicopter rotor, the process can be made more precise using other harmonics which are integer multiples of N, the number of blades.

The linear relationship of the monitor signals of the fixed or fuselage system to those signals of strain in the rotating system can be found using the well established Moore-Penrose Generalized Inverse if, and only if, the monitor signal over flight conditions matrix of which the Moore-Penrose Generalized Inverse is to be taken is conditioned in terms of the informational reliability of the measured sensor signals. The process of determining this informational matrix conditioning described hereinafter is critical to the practicality of the invention.

The matrix relating the Fourier coefficients strains or bending moments at various rotor monitor stations to the Fourier coefficients of the monitor signals of the fixed system (fuselage) consists of constants and covers all flight conditions (helicopter maneuvers). This marks a first point of departure of the present invention over the prior art. It has been incorrectly assumed by those skilled in the art that the above relational matrix is comprised of time varying coefficients, and is therefore very complex, requiring microprocessors to simulate the time dependent coefficients for various load conditions.

In Equation 1, the columns of matrix R are the R complex Fourier coefficients of a parameter of interest in the rotating system; e.g. flatwise rotor blade bending moment at a given station. Each of the C rows represent a flight condition in the sampling. The columns of matrix K are the zeroth, Nth harmonic (and other harmonics if desired) complex Fourier coefficients of L monitor transducers in the fixed system. For H harmonics and the steady component, there are $L \times H$ columns in the matrix K.

$$[R] = [K][C] + [E] \quad C \times R \quad C \times (L \times H) \quad (L \times H) \times R$$
$$C \times R \tag{1}$$

C is the relational matrix and E a matrix of errors or residuals, allowing for the number of rows, C, to be greater than the number of columns, $L \times H$, in matrix K so that Equation 1 does not violate the mathematical principle that there is no solution to more equations than unknowns.

Equation 1 establishes that the matrices form a linear system that can mathematically be considered to reside in a linear vector space. As detailed hereinafter, both the K and C matrices comprise corresponding reduced matrices $K_O$ and $C_O$ which mathematically span the vector space and which consist of J informationally independent columns of K and J rows of C, respectively. In other words, $K_O$ and $C_O$ are subsets of K and C, such that there exists linear combinations of $K_O$, $C_O$ which can generate all the elements of R with minimum Euclidian norm of error. Therefore, only the reduced matrices $K_O$, $C_O$, are needed to establish a correlation between R and K. It is important to note that it is only the indentification of the consistent informational content of matrix $K_O$ that allows for a consistent analytical solution. The method and apparatus of the present invention which obtains the reduced matrices $K_O$ and $C_O$ marks an important, second point of departure of the present invention over the prior art.

To find the reduced matrix $K_O$, the matrix K is generalized to be a N×M order matrix. The first column of K is independent by definition. Subsequent columns are compared with the independent column(s) in accordance with an algorithm detailed hereinafter to establish which elements are independent and ultimately comprise the reduced matrix $K_O$. After the reduced matrix $K_0$ has been determined, the reduced matrix $C_O$ can be computed using conventional mathematical techniques by the use of measured load data on the rotating helicopter system which comprise the matrix R.

The present method and apparatus for obtaining $K_0$ simply determines whether the vector defined by the subsequent column K is independent of the subspace defined by the matrix of columns previously determined to be independent. As an example, let K be an N×M matrix with the first J columns independent. The independence of the J+1 column is to be determined. $K_{n,j+1}$ indicates the sub-matrix of F having only columns 1 through j+1. The independence of vector $k_N$, $j+1$ comprising the elements of the j+1 column of K is determined as follows:

$$K_{N,J=1}^T K_{N,J+1} = \begin{bmatrix} [K_{N,J}^T K_{N,J}] & \{K_{N,J}^T k_{j+1}\} \\ [k_{j+1}^t K_{N,J}] & k_{j+1}^t K_{j+1} \end{bmatrix} \quad (2)$$

where $K^T_{N,j+1}$ corresponds to the transpose of $K_{N,j+1'}$ with $k_{J+1}$ corresponds to the j+1 row of K and $k^t_{j+1}$ is its transpose.

Furthermore, define $k^O_{(j+1)}$ to be:

$$k_{j+1}^{(o)} \hat{=} K_{N,J}C = k_{j+1} + e \quad (3)$$

where "e" is the error value indicative of the independence of the column vector $K_{N,j+1}$. Define the function $e^t e$ to be:

$$e^T e = e^T K_{N,J}^T K_{N,J} C - C^T K^T_{N,J} k_{j+1} - k^T_{j+1} K_{N,J} e + k^T_{j+1} k_{j+1} \quad (4)$$

The function $e^T e$ corresponds to the sum of the squares of the error of equation (1). The rate of change of the function $e^T e$ with respect to the transpose of the function $C^T$ at a maximum or minimum is as follows:

$$\frac{\partial e^T e}{\partial C^T} \overset{\Delta}{=} o = K^T_{N,J} K_{N,J} C - K^T_{N,J} k_{j+1} \quad (5)$$

this allows us to solve for c:

$$C = (K^T_{N,J} K_{N,J})^{-1} K^T_{N,J} k_{j+1} \quad (6)$$

This value of c is then inserted back into equation 2, yielding:

$$k_{j+1} = K_{N,J}(K^T_{N,J} K_{N,J})^{-1} K^T_{N,J} k_{j+1} \quad (7)$$

The value of $K^O_{j+1}$ which results allows for the following identity:

$$k_{j+1}^{(o)T} k_{j+1}^{(o)} = k_{j+1}^T K_{N,J}(K^T_{N,J} K_{N,J})^{-1} K^T_{N,J} k_{j+1} \quad (8)$$
$$= k_{j+1}^T K_{N,J}(K^T_{N,J} K_{N,J})^{-1} K^T_{N,J} k_{j+1}$$
$$= k_{j+1}^T k_{j+1}^{(o)}$$

The function $e^T e$ can then be rewritten as:

$$e^T e = k_{j+1}^{(o)T} k_{j+1}^{(o)} - k_{j+1}^{(o)T} k_{j+1} - k_{j+1}^T k^{(o)} + k_{j+1}^T k_{j+1} \quad (9)$$
$$e^T e = k_{j+1}^T k_{j+1} - k_{j+1}^{(o)T} k_{j+1}^{(o)}$$

and $$k_{j+1}^T k_{j+1} = e^T e + k_{j+1}^{(o)T} k_{j+1}^{(o)} \quad (10)$$

enabling $$e = k_{j+1}^{(o)} - k_{j+1} \quad (11)$$
$$k_{j+1}^{(o)T} e = k_{j+1}^{(o)T} k_{j+1}^{(o)} - k_{j+1}^{(o)T} k_{j+1} = 0$$

Equation 11 corresponds to the dot product of $K^O_{j+1}$ and e. These vectors are orthogonal, since their dot product is 0. Therefore, $k^o_{j+1}$ is orthogonal to e. Consequently, equation 10 corresponds to the Pythagorean Theorem, where $e^T e$ and $K^O_{j+1} K^O_{j+1}$ can be thought to correspond to the orthogonal sides of a right triangle having $K^T_{j+1} K_{j+1}$ as the hypotenuse with angle opposed to the $\alpha$ $e^T e$ side $\sin^2 \alpha^2 x$ corresponds to:

$$e^T e = k_{j+1}^T k_{j+1} - k_{j+1}^T K_{N,J}(K^T_{N,J})^{-1} K^T_{N,J} k_{j+1} \quad (12)$$

$$\sin^2 X = 1 - \frac{1}{k_{j+1}^T k_{j+1}} k_{j+1}^T K_{N,J}(K^T_{N,J} K_{N,J})^{-1} K^T_{N,J} k_{j+1}$$

Physically, $k^O_{j+1}$ is in the vector space of $K_{N,J}$ while e is orthogonal to that vector space. If the value of $\sin^2 \alpha$ exceeds a pre-selected value, typically $2 \times 10^{-d}$ where d is the number of significant figures of the measured signal, then that column can be considered to be independent of the vector space $K_{N,J}$ and is retained in the reduced matrix $K_O$.

For two dimensions, the above analysis can be simplified. The matrix $K_{N,J}$ corresponds to an arrow vector A postioned in a plane. A second vector B corresponds to the j+1 column of K and is arbitrarily positioned in the plane with respect to A; $K^O_{j+1}$ correspond to the projection of B onto A while e corresponds to that portion of B which is orthogonal to A.

The process described hereinabove is repeated sequentially on an element by element basis for each of the columns of K. If a column is determined to lack sufficient independence, i.e. if the magnitude of $\sin^2 \alpha$ is less than the independence criterion, then that column is not included in $K_O$.

Once the reduced matrix $K_O$ is determined, the corresponding elements of R are measured by local instrumentation. For the rotating helicopter blades of FIG. 1, blade bending loads (moments) are established from local blade bending measurements for each flight conditions. Having determined R, $C_O$ can be determined using the relationship:

$$[C_O] = ([T_O]^T [T_O])^{-1} [T_O]^T [B] \quad (13)$$

The columns of C missing from $C_O$ are made to equal 0. The remaining elements of C are then linear combinations of the elements of $C_O$.

After the matrix C has been determined in a calibration process, the controller 20 is configured to analyze signals from the transducers according to:

$$R = KC \qquad (14)$$

Referring again to FIG. 1, the transducer signals pre-entered on line 22 comprise the data input to the controller. The present controller accepts a plurality of analog Data Input signals being independent measurands transduced from the fixed system of the helicopter by strain gauges, accelerometers or other mechanical sensing devices. In the present embodiment, such inputs are employed. However, there is no fundamental limit on the number of such inputs that may be employed. The transducer signal levels are preferably + or −10 volt levels with known voltage-to-measure and scale constants. Additionally, the controller receives a once per blade revolution (tachometer) signal on lines 31 that comprises a single "1/Rev" temporal reference signal, being a pulse train at the (radian) frequency, p, of the main rotor. This signal is derived from a "once per turn" or "blooper" sensor that physically monitors each complete rotation of the rotor. The tachometer signal is conditioned by signal conditioning logic circuitry 32 which provides a conditioned 1/Rev logic signal on line 33. This signal (5) is level compatible with the controller's logic signal levels and exhibits rapid rise and fall times. This signal also exhibits a sharp rising edge once per rotor revolution.

The Conditioned 1/Rev signal is the input to a "period-locked loop with phase assertion" (PLLPA) circuit, 34. This circuit provides three output signals. A 2048/Rev PLLPA output signal presented on lines 35 comprises a signal pulse train a 2048 times the frequency of the rotor. This pulse train determines the frequencies of synthesized sine and cosine waveforms. A Phase=-Zero PLLA output signal (line 36) is a pulse train of 1/Rev frequency, with a rising edge time locked to the rising edge of 2048/Rev, 7, that immediately follows the rising edge of Conditioned 1/Rev, 5. This signal determines the phasing of the synthesized waveforms. A Lock Output logic signal (line 37), is asserted "high" whenever 2048/Rev signal and the Phase=Zero signal are synchronized to the conditioned 1/Rev signal. This condition denotes "normal" operation of the controller and correct signal processing. Whenever the rotor speed departs from the normal flight envelope (as in starting and stopping) the signal on line 37 is asserted "low" to indicate that proper processing has ceased.

Both the 2048 and Phase=Zero signals are input to a multiple sine/cosine synthesizer circuit 38. This circuit generates the required sine and cosine digital word streams. These are rapidly sequenced onto Sine/Cosine Data Buses, 39, at each of 2048 equally time spaced intervals during the rotor's rotation. This bus also presents certain operative timing signals required by other circuitry detailed hereinafter to access the input data signals. A second bus, Order (n) Select Bus 40, is used to indicate which Sine or Cosine function is present on 10 at any given time. Signals presented on the order bus are also routed to other processing circuits.

As detailed hereinafter the Order (n) Select Bus, 40, has N signal lines. Each of these is asserted (solely) in turn, indicating the harmonic order (1 to N) of the data present on bus 10. One cosine sample followed by one sine sample is present on data bus 39 for each such assertion. Alternative and more compact codings are possible for more extensive implementations.

The transducer signals are received by a Fourier Coefficient detector 41 that allows the system to decompose the input signal and selectively output one or more of the real and imaginary Fourier coefficient signal component pairs. Preferably each of the analog input signals is applied to a separate Fourier coefficient detector circuit. Each of the detector circuits is interconnected to the digital data buses.

Each Fourier coefficient detector circuit, computes two analog coefficient signals provided on lines 42, 43. These are voltages proportional to the real and imaginary Fourier coefficients (respectively) for a single harmonic order of rotor rotation, (the rth). Each detector is separately programmable as to which order it will detect. This is accomplished by jumper connection to one of the N signals in the Order (n) Signal Bus, 40.

For the preferred embodiment, all Fourier coefficient detector circuits are programmed for the 4th harmonic of rotor rotation (r=4) in the examination of a four bladed helicopter. Those skilled in the art will note that each detector circuit is completely independent of the others.

Corresponding sets of analog coefficient signals are transmitted on lines 42, 43 to a Coefficient Programming Module, 44, one set from each detector circuit. By way of illustration and not of limitation, each detector circuit transmits these signals and their negatives.

As previously discussed, the Holometric relationships between measurands of the rotating and non-rotating systems are related by the complex matrix equation of equation 1.

Note that this relationship defines a multiplicity of rotating system response. The embodiment of FIG. 1 is restricted to the measurement of a single response variable. Only a single column of the R matrix or vector is sought.

In this circumstance, consequently only a single corresponding column of the C matrix is needed as the strain or movement is also a vector.

To express this restricted computation in terms of the variables illustrated in FIG. 1, the equation notation can be modified. Note that rather than utilizing complex notation, the dimensions of both vectors and the matrix are doubled and employ corresponding real valued coefficients. This results in:

$$\begin{Bmatrix} A_1 \\ A_2 \\ \vdots \\ A_N \\ \hline B_1 \\ B_2 \\ \vdots \\ B_N \end{Bmatrix} =$$

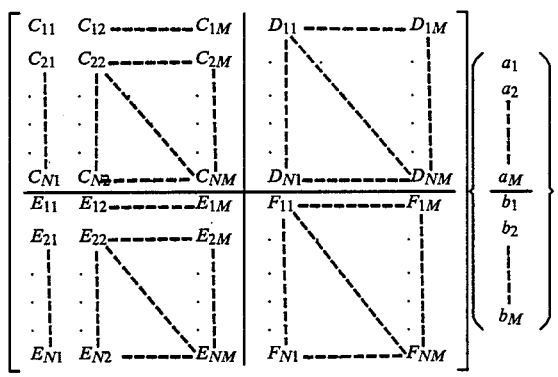

Here the pairs of a and b vector elements are the real and imaginary detector circuit output signals presented on lines 42 and 43, respectively. The N pairs of A and B vector elements are the real and imaginary Fourier coefficient signals output by the Coefficient Programming Module on lines 46 and 47 and required by the N component synthesizer 48.

The C, D, E, and F matrix terms are the (K matrix) Holometric coefficients derived by the calibration methodology detailed above. Note that a total of 4MN of these are required, and that they are each real valued constants.

The matrix multiplication is implemented by weighted analog summations implemented with operational amplifiers. This real-time process continuously updates the N pairs of coefficient signals in response to instantaneous variations in the M pairs of detected coefficients.

In the current embodiment, the K matrix coefficients are programmed by 4MN precision resistors mounted to an interchangeable programming printed circuit board. This represents a minimum production cost embodiment. In alternative implementations, this coefficient programming module can be replaced by a like number of four-quadrant multiplying digital-to-analog converters (DACs). This permits programming the Holometric coefficients from an internal microprocessor or external computer. Such a configuration maintains the instantaneous computation of the required Fourier coefficients. It simplifies changing the program of the device and supports rapid changes in a target measurand. It further supports adaptive "learning" of the Holometric coefficients in an "artificial intelligence" sense.

Each of the N pairs of analog Fourier coefficient signals, (lines 46, 47) is applied to one of N identical component synthesizers, 48. Each of these receives signals from the digital data buses, 39, 40. Each component synthesizer performs a pair of digital/analog multiplications and sums the two resulting analog product signals to derive one of the N harmonic analog component signals, output on line 50. Each real component signal is multiplied by a cosine wave at a specified harmonic (n) of the rotor rotational rate. Each imaginary component signal is multiplied by a sine wave the same frequency.

Each of the N component synthesizers may be programmed to use any of the rotor order, 1 through N. This selection is accomplished by appropriate jumper connection to the Order (n) Select Bus, 40. In the embodiment of FIG. 1, each of the synthesizers uses a separate harmonic order. This is the most probable arrangement for any application, but two or more synthesizers may be locked to the same order, if required.

The N separate harmonic components of the desired signal are summed together with an operational amplifier and precision resistors network, comprising the analog summer, 52. The output of this process is the desired analog measurand signal, provided on line 53. The precision resistors utilized in this final summation are housed on the coefficient programming module, 15. This configuration permits selectable unequal weights in the final summation. This is deemed desirable as it allows the re-apportionment of computational gains throughout the processing circuits in the event that a significant difference in dynamic range and/or spectral content exists between the input measurands.

Excessive analog signal levels can distort the various computed signals in this process. Comparator based overload detectors are distributed throughout the controller circuitry to detect and report such exceedances, thus indicating invalid computation. Tests are made in each Fourier coefficient detector each component synthesizer and the final analog summer.

Within each of these elements, the dynamic signals are constantly compared against a stable reference voltage equal to 83% of the analog power supply voltage. These comparisons generate a "local" error signal whenever exceedance is detected (and before signal clipping actually occurs). Such comparisons are made at each point where a gain change or signal addition is performed. Each overload detector incorporates a "pulse stretcher" so that even a very brief exceedance will cause an error indication which persists for approximately 5 rotor revolutions.

Within each Fourier coefficient detector, two such test points are monitored and their resulting local overload detection logic signals "wire-ORed" to provide a single logical output, signal on line 54. A separately buffered version of this signal drives a local indicator LED. Within each component synthesizer circuit, a single test is performed. Each such module outputs a local overload signal, on line 55, and has an LED driven by a separately buffered version of the signal. The output of the analog summer is also monitored. An overload here is indicated on line 56 by local overload signal. Again, a local LED is driven by a separately image of this signal.

Overload detection signals are all "active low" signals. These signals are logically merged and inverted by circuit 57 which provides an "active high" Overload Output logic signal on line 58.

Figure 2:
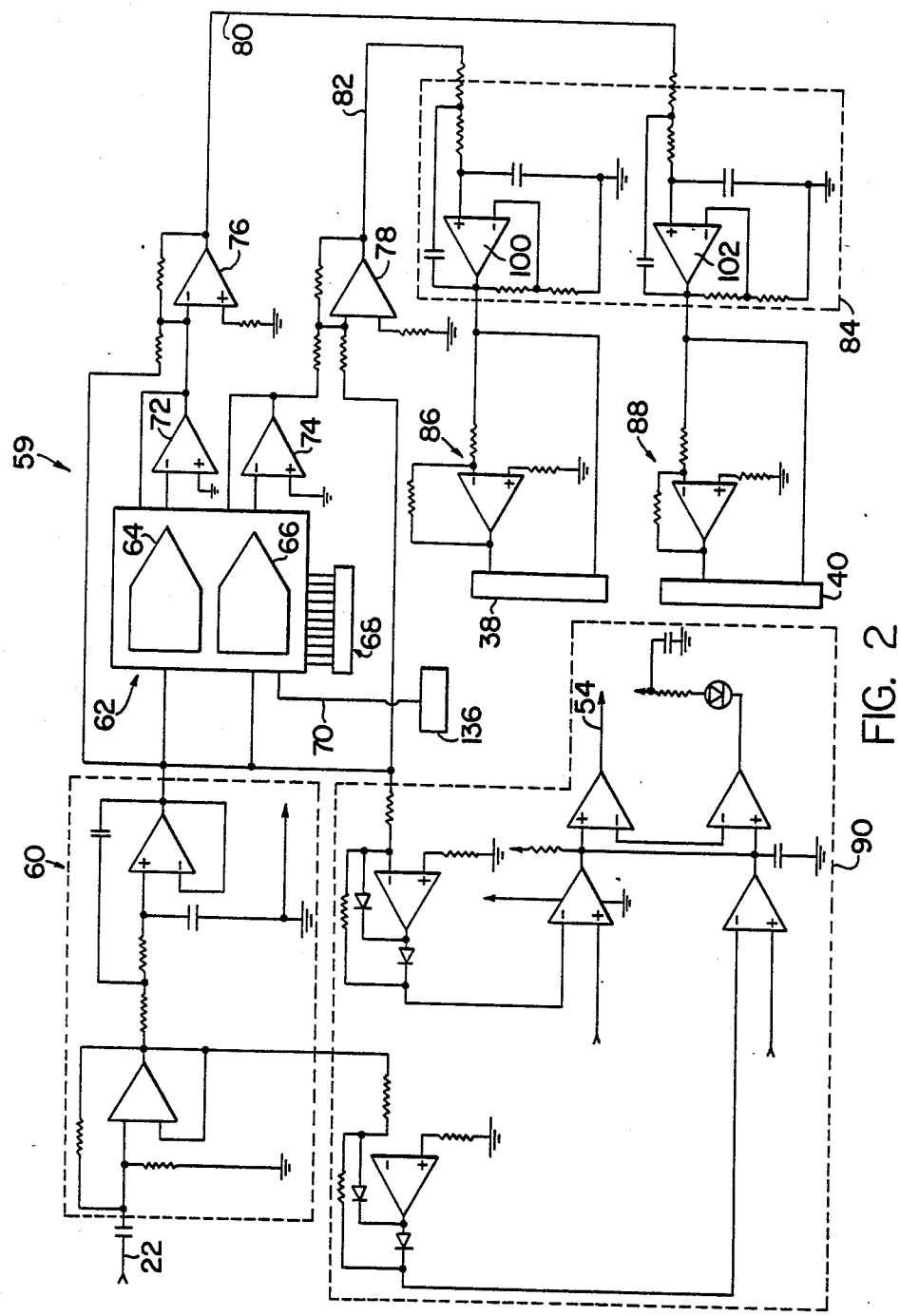
FIG. 2 is a detailed description of a portion of analysis circuitry used with the controller of FIG. 1.

FIG. 2 illustrates one of eight identical analysis circuit sections 59 which comprise the Fourier Coefficient detector 41 of FIG. 1. The controller returns a Computed Output analog signal on line 53, being the holometric synthesis of a measurand within the rotating rotor system, such as a blade bending moment or strain. This signal faithfully reproduces the dynamic characteristics of the target measurand as they occur and must thus be deemed an indirectly transduced measurement. It functionally replaces a signal derived by direct transduction in the rotating system and eliminates the attendant signal conduction problems. While the present embodiment returns a single such output, a plurality of such transductions may be accomplished by a single device.

The Overload Output signal (line 58) is a logic signal reflecting the presence of distortion producing over-loads (signal excesses) anywhere within the Holometric Synthesis computation. This signal is of a logic "low" level for valid operation. A logic "high" indicates that the Computed Output signal may reflect the results of computational exceedances and is thus potentially invalid. A plurality of local Overload indicator lamps is also provided, one for each point of potential signal overload.

The Holometric Synthesis depends upon temporal synchronization of internally generated sine and cosine waves with the rotative frequency of the rotor. This can be accomplished over the normal range of in-flight rotor speeds. Successful synchronization is reflected by a "high" level of the Lock Output, logic signal (line 37). This signal goes to a logic "low" state whenever such necessary temporal alignment is lost. In this situation, the Computed Output, 3, must be deemed invalid. A local Lock indicator lamp is also provided.

The three circuit elements 32, 34, 38 are employed to derive a series of time variant sine and cosine waves at frequencies 1, 2, 3 ... N times the rotative speed of the rotor. These are produced as a series of "digital" data words utilized by subsequently discussed processing elements. Each such waveform contains 2048 data words per rotor revolution. Systems can be constructed using more or less resolute sampling as dictated by analytic requirements specific to the application.

In the present embodiment, each such sample word is of 8 bit precision. Systems can be constructed with lesser or greater word lengths. Eight bit precision and the commercial analog components provide a "5% precise" transduction with better than 40 dB of dynamic range. More precise systems of greater dynamic range are feasible using the methods described.

The controller of FIG. 1 digitally synthesized the first eight harmonics of rotor speed; that is, $N=8$. A greater or lesser number of terms may be employed with no change in fundamentals. The digital sine and cosine samples are transmitted to the Fourier Coefficient detector circuits 41 and component synthesizer circuits 48 through a simple word parallel Sine/Cosine Data Bus, 39. Data for all the synthesized functions are transmitted in a "time multiplexed" or "interleaved function" fashion. That is, data corresponding to a single rotor angular position for each of the 2N harmonic functions are placed on the bus sequentially. In the present embodiment, these are alternating cosine and sine functions of ascending harmonic order. Higher bandwidth systems may employ alternative parallel bussing of each harmonic function or groups of functions. Alternative orthogonal functions may also be employed. Each of the identical circuit sections of Fourier coefficient detector 36 band limits a single analog input signal $X_j$, detects it Fourier coefficients $a_{jR}$ and $b_{jR}$ with respect to an individual selectable rotor order (rp) and passes DC signals equal to those coefficients to the programming module 44.

Analog transducer signals received on line 22 are presented to a band pass filter circuit 60 which serves to filter and AC couple the input data signal received from the transducer. As detailed hereinabove, it is preferable that the controller extract only the 4/rev. or 4P component of the input transducer data signal. As those skilled in the art will note, the above band pass filter introduces essentially no gain error for any order, 1P through 8P. However, a small angle phased error is introduced on the order of $-6.5°$ for the 4P (4/rev.) signal component. An error of this magnitude has been deemed an acceptable trade-off to eliminate strain gauge bridge amplifier DC signal errors and external signal noise above 150 Hz. The averaging filters were set to a time constant nominally equal to the period of rotor revolution. This is a component programmable characteristic and may be selected as required by the dynamics and The signal/noise ratio of the examined input signals.

Each of the real Fourier coefficients is computed by multiplying an analog input signal, 1, by the digital cosine wave for the rth harmonic order. This is accomplished by using a four-quadrant multiplying digital to analog converter (DAC). the DAC receives its digital data from bus 39 during the appropriate time as defined by bus 40. The DAC's analog product is low pass filtered to remove components at frequency 2rp and to average the resulting coefficient for a selectable time period. This results in a very low frequency signal, instantaneously proportional to the required coefficient. In the case of steady flight condition, this signal is a constant (DC) voltage. Each of the imaginary Fourier Coefficients is computed in similar manner. The sole difference is that the sine wave at the rth harmonic order is employed.

The band limited data signal is applied to both analog inputs of a dual multiplying digital-to-analog converter (DAC) circuit 62. A first half 64 of the DAC 62 multiplies the received band limited analog data signal by a digital cosine signal, while a second half 66 multiplies the analog input data signal by a sine signal.

The digital sinusoid signals are provided on data bus 68 by the synthesizer. The digital sinusoid signals include orders 1P through 8P. Selection of the desired signal order is dependent on signals received on line 70. In the preferred embodiment, a simple jumper from the digital synthesizer determines which order is utilized, with order 4P selected for the controller of FIG. 1.

The signals output from the digital-to-analog converter are currents proportional to the input voltages. The DAC 62 contains internal reference resistors for external voltage to current conversion. The output signals are converted to voltage signals in the conventional manner by amplifiers 72 and 74. The output voltage signals reflect "2 quadrant" multiplication of the bi-variant analog input signals with digital codes representing solely positive numbers. Specifically:

$$V_{U4p1} = -V_{U1p8}*(Code_A)/256$$
$$0 \leq Code_A \text{ or } Code_B \leq 256 \quad (15)$$

$$V_{U4p7} = -V_{U1p8}*(Code_B)/256 \quad (16)$$

In as much as "4 quadrant" multiplication is required, the 8 bit codes presented at data bus 80 to represent bi-variant sinusoids in conventional off-setting binary format. Amplifiers 76 and 78 complete the multiplication process by subtracting the analog input signals received from twice each of the two quadrant product signals, resulting in:

$$V_{U4p14}V_{U1p8}*(Code_A-128)/128 \quad (17)$$

and $$V_{U4p8} = V_{U1p8}*(Code_B-128)/128 \quad (18)$$

In the preferred embodiment, the digital codes are selectively provided from an Erasable Programmable Read Only Memory (EPROM), described hereinafter, programmed to perform following:

$$\text{Code}_A = \text{INTEGER}(128 + 127 * \text{COS}(rp)) \quad (19)$$

and $$\text{Code}_B = \text{INTEGER}(128 + 127 * \text{SIN}(rp)) \quad (20)$$

As a result, the output voltage signals presented on lines 80 and 82 represent instantaneous product signals having the form:

$$V_{U4p14} = (X_j * \text{COS}(rp))/2 \quad (21)$$

and $$V_{U4p8} = (X_j * \text{SIN}(rp))/2 \quad (22)$$

Each of these signals is averaged by a low pass filter 84. The signals provided therefrom are DC voltages representing the negatives of Fourier coefficients $a_{JR}$ and $b_{JR}$. These signal values reflect the instantaneous change in the coefficients as flight conditions change. The respective Fourier coefficients reflect a moving or exponential average over approximately 3 rotor revolutions, matching the processing normally applied to PCM telemeter flight data.

Amplifiers 86 and 88 are configured as unity-gain inverters. These amplifiers generate positive signal images of the signals representing Fourier Coefficients $a_{JR}$ and $b_{JR}$. Positive and negative signal images of the Fourier Coefficients are presented to the program board, as described hereinafter. In addition, the computed DC signal levels must be scaled so that the signals are equal in magnitude to the vector values (0 to peak) of the corresponding quadrature signal components at the frequency 4P present in the $X_J$ signal component of the output signal. Therefore, if the analog input signals are free from overload error, the corresponding output signals are likewise error free.

In addition to the functions described hereinabove, the controller also provides for signal overload protection by means of overload circuitry 90 which preferably comprises conventional comparators and converters configured to detect excursions of the signals in each circuit above a threshold value indicative of an overload. A local indicator of an input overload for the respective signal channel is provided for such detector. This signal is logically configured with all other similar overload signals from the remaining associated circuitry of the Fourier coefficient detector to yield a single global input signal overload indication.

Figure 3:
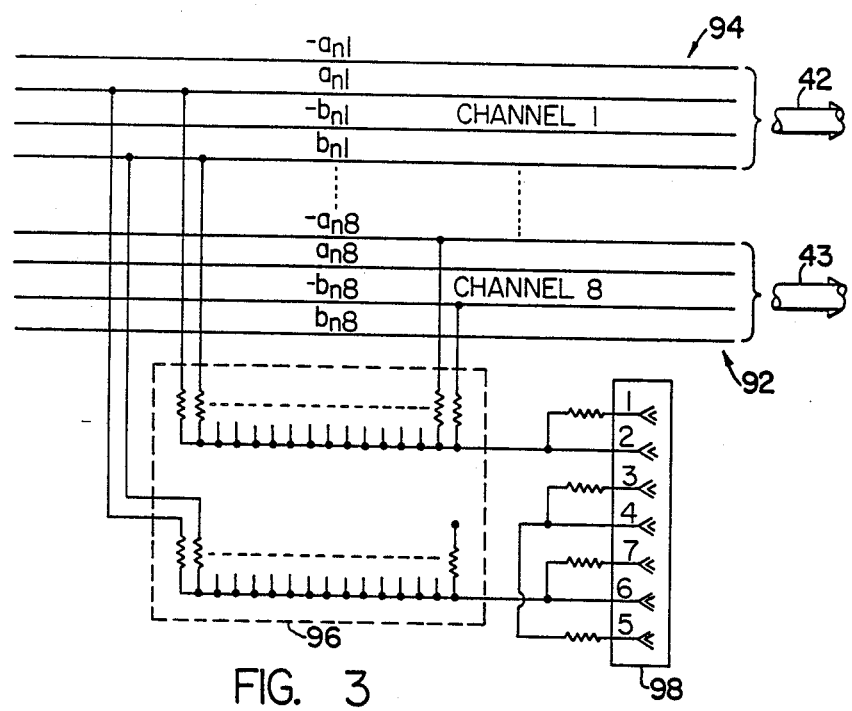
FIG. 3 illustrates a portion of the coefficient programming module of the controller of FIG. 1.

For each of the signal channels output from the detector, there is a corresponding plurality of signal lines which present signals corresponding to the coefficients generated by the detector. Shown in FIG. 3 are two sets of signal lines 92 and 94. Each set is comprised of four signal lines that present signals whose magnitudes correspond to the plus and minus signals of the Fourier coefficients generated for that channel.

Each line is electrically configured with a corresponding resistor which is located on programming board 96. The values of the respective resistors are selected to correspond to the elements in the C matrix previously established by the calibration procedure detailed above. Since the elements of the coefficient matrix are constant, their electrical equivalents are resistors of fixed value. Furthermore, each of the resistors are configured at 98 with digital synthesizer in a manner that is detailed hereinafter. The coefficient programming module presents signals on lines 46, 47 (FIG. 1) whose voltages have the form:

$$C_{Anbjr} = R_{RefAn}/R_{Anbjr} \quad (23)$$

Figure 4:
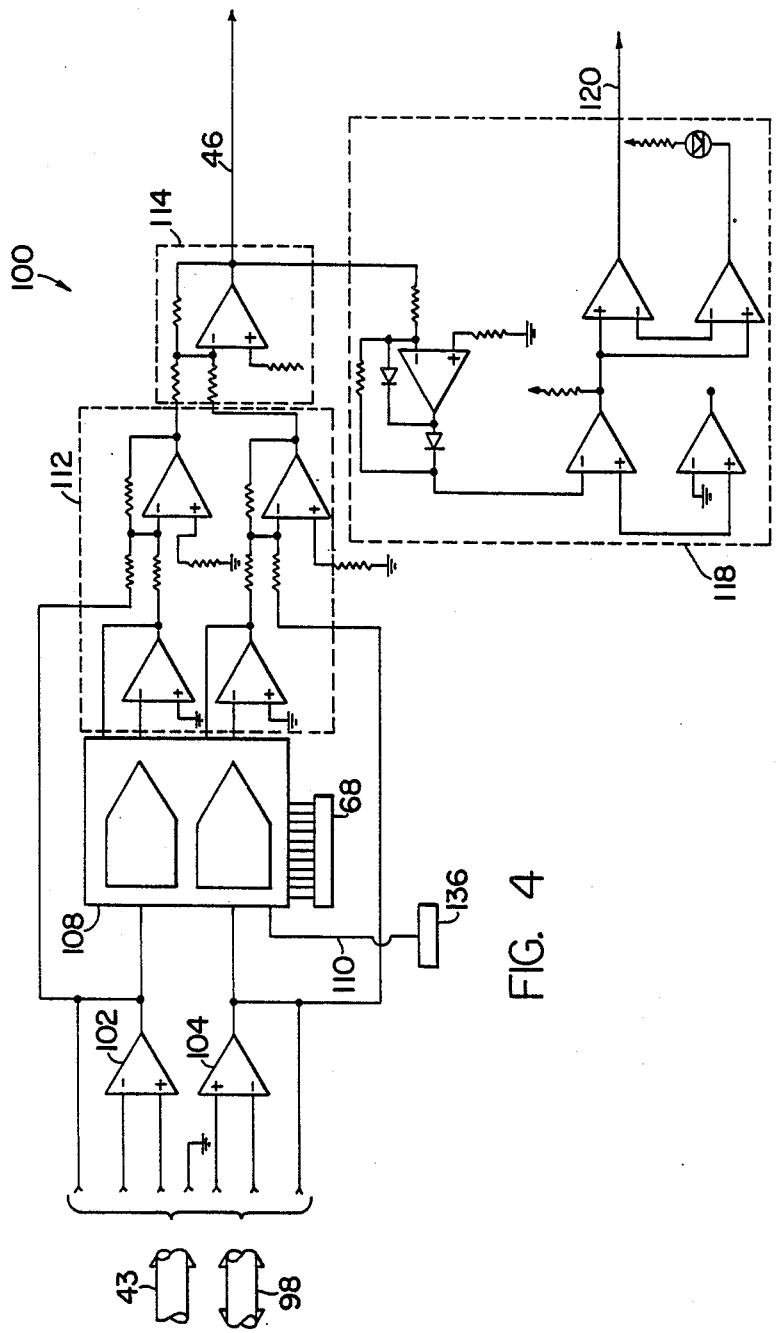
FIG. 4 is a schematic illustration of a component synthesis circuit portion of the controller of FIG. 1.

FIG. 4 is a schematic illustration of a component synthesis circuit 100; one of six identical such circuits in the preferred embodiment. The component synthesis circuit includes summing amplifiers 102 and 104. Amplifier 102 provides a DC signal voltage equal to the $n^{th}$ real Fourier Coefficient $A_N$ which describes the amplitude of the cos (np) content in the synthesized output signal Y(t). The signal is formed in accordance with:

$$V_{U7p7} = -A_n = -R_{RefAn} * \sum_{j=1}^{8} [(a_{jr}/R_{Anajr}) + (b_{jr}/R_{Anbjr})] \quad (25)$$

where $R_{AJR}$, $R_{ANBJRN}$, $R_{ref\,AN}$ are values in ohms of programming resistors found in the corresponding $n^{th}$ column of the coefficient programming board. Note that the magnitudes of these resistors are related to the holometric coefficients $C_{anajr}$ and $C_{anbjr}$ such that:

$$C_{Anajr} = R_{RefAn}/R_{Anajr} \quad (26)$$

and $$C_{Anbjr} = R_{RefAn}/R_{Anbjr} \quad (27)$$

In a similar manner, summing amplifier 104 signals corresponding to the $n^{th}$ imaginary Fourier Coefficient $B_N$, describing the amplitude of the sin (np) content in output signal Y(t) in accordance with:

$$V_{U7p1} = -B_n = -R_{RefBn} * \sum_{j=1}^{8} [(a_{jr}/R_{Bnajr}) + (b_{jr}/R_{Bnbjr})] \quad (28)$$

and $$C_{Bnajr} = R_{RefBn}/R_{Bnajr} \text{ and (20)}$$
$$C_{Bnbjr} = R_{RefBn}/R_{Bnbjr} \quad (29)$$

The computed Fourier Coefficients $-A_n$ and $-B_n$ are provided to both the coefficient programming module at 98 as well as the remainder of the component synthesis circuit. The negative image DC signal voltages are independently applied as analog inputs to dual multiplying digital-to-analog converter (DAC) 108. In a manner similar to the DAC described hereinabove, DAC 108 receives digital inputs from the digital processor that is described hereinafter. The $-A_n$ coefficient is multiplied by a digital image of cos (np). The $-B_n$ coefficient is multiplied by digital image of sin (np). Those digital image signals are received on data bus 39.

The rotor order n is determined by signals received on line 110. In the embodiment of FIG. 1 includes 6 of the synthesizer circuits with a single electronic characteristic, the rotor order, differentiating each of the 6 separate sections. Each component synthesis circuit section references a different rotor order, n, in a sequence 1 through 6. Although it is preferable to configure the synthesizer circuit sections as described hereinabove, those skilled in the art will note that modifications to the selected orders may be made as required by the application.

The configuration and operation of DAC 108 is as described above and, represent two quadrant multiplication of the bi-variant analog signal inputs with the digital codes representing solely positive numbers; yielding:

$$V_{U4p14} = (Xj^* \text{ COS } (rp))/2 \quad (30)$$

and $$V_{U4p8} = (Xj^* \text{ SIN } (rp))/2 \quad (31)$$

Negative signal images of the $n^{th}$ order cosine and sine components of the ultimately desired output signal Y(t) are generated by amplifier 112 whose signal voltages have the form:

$$V_{U8p8} = -An^* \text{ COS } (np) \quad (32)$$

and $$V_{U8p14} = -Bn^* \text{ Sin } (np) \quad (33)$$

These two signals are added by an inverting summer circuit 114. The summed signal is the $n^{th}$ order contribution to the final output signal, Y(t), and is provided back to the coefficient programming module at 98 as $Y_n(t)$. Consequently:

$$V_{J3p8} = V_{U8p1} = Vn(t) = An^* \text{ Cos } (np) + Bn^* \text{ Sin } (np) \quad (34)$$

This signal is presented on lines 52 and is subjected to overload monitoring by an overload detection circuit 118 whose output signal is presented on lines 120. Circuit 118 is the same as the overload circuit described hereinabove with respect to FIG. 2.

Figure 5:
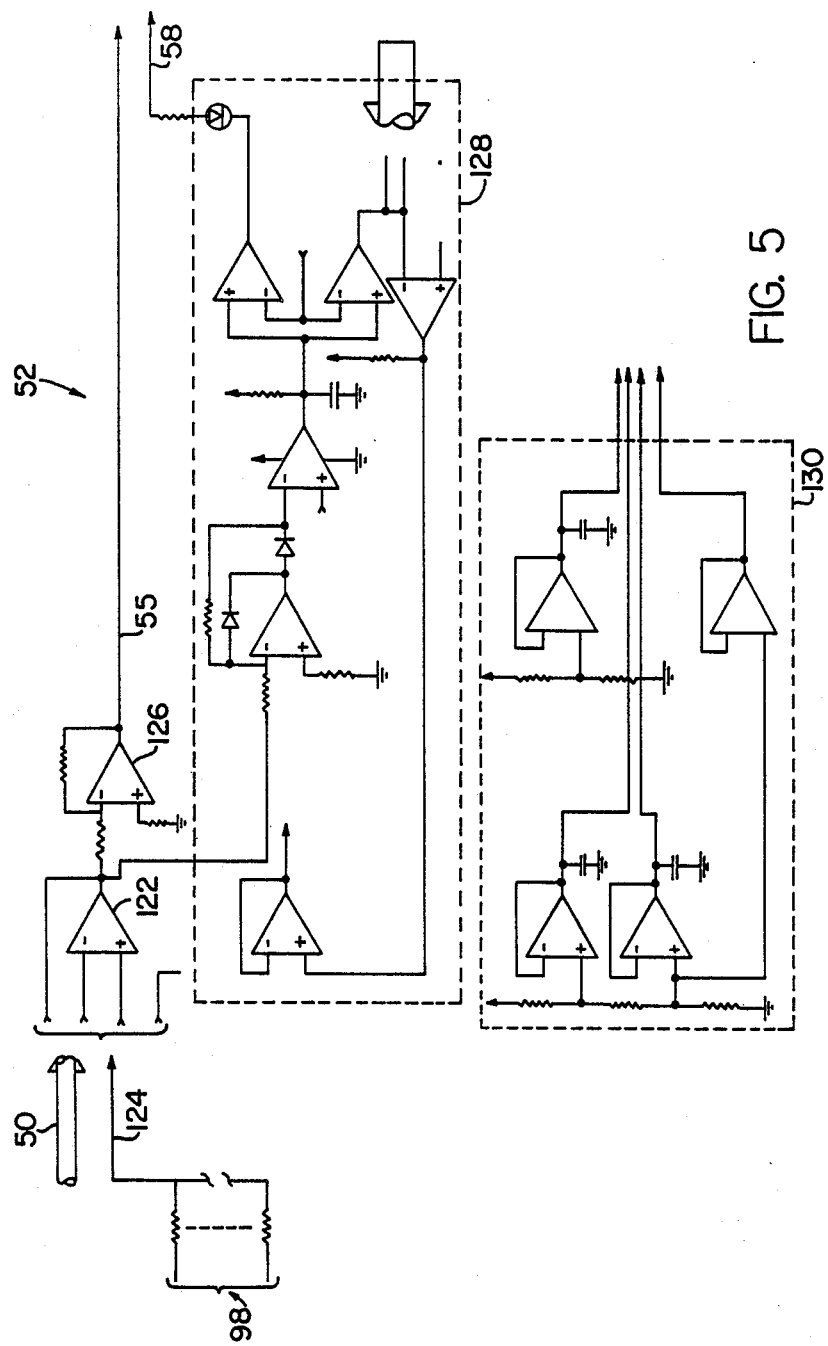
FIG. 5 is a schematic illustration of an analog summary circuit of the controller of FIG. 1.
Figure 6:
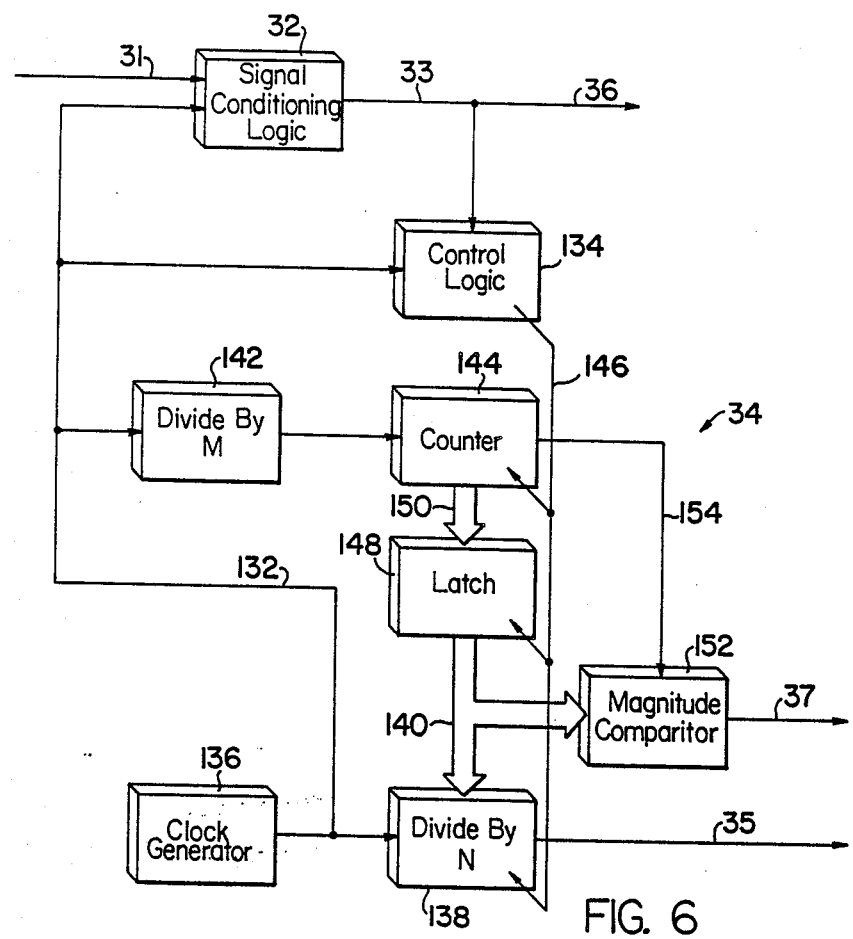
Figure 7:
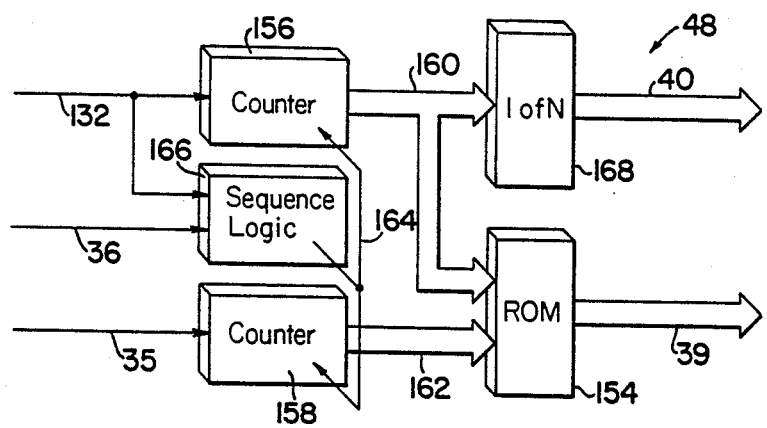

Referring now to FIG. 5 there is a schematic illustration of a portion of the analog summer circuit 54 of the controller of FIG. 1. The analog summer circuit performs two disparate analog circuit functions and is not replicated within the controller. The analog summer circuit adds the six signal components $Y_n(t)$ received from the multiplying resolver to form the output signal Y(t) in accordance with:
In addition to the $Y_n(t)$ signal components presented on lines 52, amplifier 122 receives signals on lines 124 from the programming board. As detailed above, the resistors installed on the programming board are configured to complete an inverting/summation circuit, including amplifier 126, whose output signal on lines 55 corresponds to the desired parameter signal Y(t). In equation 34, $R_{pn}$ corresponds to the values of respective order $R_p$ selecting resistors 96 located on the programming board.

In general, certain orders of the signals output from the multiplying resolver will dominate as compared to others. Maximum precision for the controller is obtained by configuring all of the computed analog voltages to be at or near the full scale voltage level, typically +or −10 volts. For example, it may be desirable, to configure the circuit to provide additional gain in the synthesis of a single constituent component of $Y_n(t)$ and then provide a corresponding attenuation in the analog summer during final summation of the signal.

As described hereinabove, each controller circuit provides for signal overload monitoring. In addition to providing for overload monitoring for the output signal from amplifier 122, overload detector circuit 128 provides for "wire ANDing" of all overload signals to output a global overload detection signal on line 57 of all individual overload signals received on lines 56. These signals are normally at a logic high indicating proper operation. Circuit 130 is conventional, and generates reference voltage for the respective overload circuits.

Figure 6:
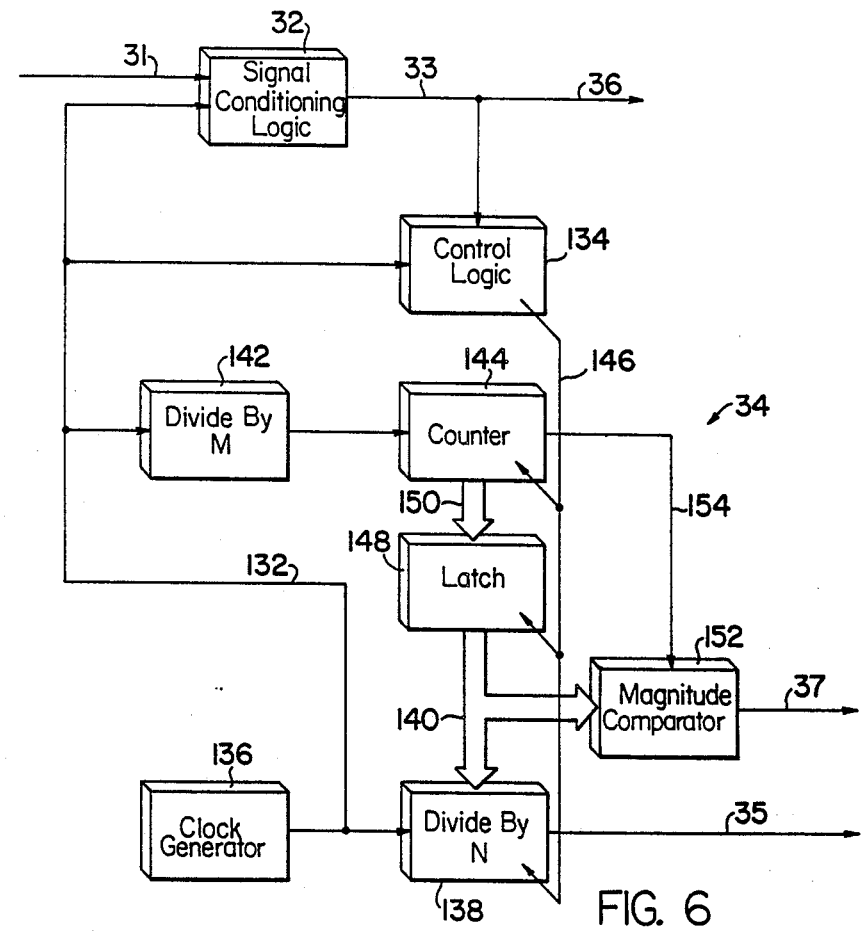
FIG. 6 is a detailed schematic illustration of a portion of a component synthesizer circuit of the controller of FIG. 1.

FIG. 6 is a detailed schematic illustration of a portion of a digital processor that is not-replicated in the controller. The period-locked loop with phase assertion (PLLPA) circuit 34 is consort with the multiple Sine-/Cosine synthesizer 48 represents a unique approach to the synthesis of period functions synchronously locked to a temporal reference signal. FIG. 6 is a schematic illustration of the circuit 34 of FIG. 1.

The PLLPA circuit accepts a period 1/Rev temporal reference signal (line 33) and generates three output logic signals (lines 35, 36, 37). The M/Rev output signal (line 35) is a logic pulse train at a frequency M times that of 1/Rev signal. In the embodiment of FIG. 1 the frequency corresponds to 2048. The Lock output signal is a logic signal that is "high" when signal is at a frequency M times that of the signal on line 31 and "low" in all other circumstances. The Assert Phase or Phase=Zero, line 36, signal is a sharp rise pulse train with the same frequency as 1/Rev, synchronized to signal.

The temporal reference signal, (line 31), is typically derived from a mechanical source. This signal is (typically) an imperfect signal, exhibiting slow rise-time and "ringing". This signal is applied to Signal Conditioning Logic, 32, which performs two classical functions. Firstly, the circuitry 32 recovers the "rising edge" of the signal through conventional Schmidt triggering. Secondly, it synchronizes this rising edge to that of a system clock signal, line 132, by conventional use of "flip-flops" and "AND gates". The resulting logic signal is the Assert Phase output signal. It is also the input to control logic circuit 134.

The System Clock signal is a logic pulse train derived from a conventional crystal oscillator based Clock Generator, 136. The frequency of this oscillator is significantly greater (i.e. 3 orders of magnitude) than that of the required M/Rev output. This clock signal is applied as an input to Divider, 138, a conventional presettable down counter serving as a frequency divider. This circuitry also accepts a digital code, on line 140, representing an integer number, N. The output signal of this divider circuit is a pulse train of frequency equal to the clock frequency divided by N. The constant, N, is derived by the remaining circuitry, 34, so that the frequency of the M/Rev output signal equals M times the frequency of 1/Rev input signal within a prescribed error. N is derived dynamically; this value is updated at the frequency of the 1/Rev input signal. This is accomplished as follows.

The System Clock signal is subjected to frequency division by divider circuit 142, a conventional down counter configured to divide by the integer, M. Its output signal comprises a pulse train of frequency equal to the clock frequency divided by M. This signal is applied to up counter, 144, as its "clock" imput. Logic control circuit issues certain control signals, on line 146, to cause the accumulated count of counter 144 to be impressed upon the divider 138 as the integer, N.

Control logic circuit dictates the following specific action. At each rising edge of the Assert Phase signal, the current accumulation of counter 144 is transferred to storage Latch 148. The counter 144 is reset to zero and enabled to accumulate, again. Thus Latch 148 retains the period of the signal input on line 31, expressed as a multiple of M System Clock periods. This number is the constant, N, and is reevaluated for each period of the 1/Rev input signal.

Immediately after transferring counter 144 output code word on lines 150 to latch 148, the Control Logic, circuit 134 causes Divider 138 to accept latch 148 signal value as its dividing constant, N. This causes the frequency of the M/Rev output signal to be at a frequency M times that of the average of the signal on line 31 during said signal's last period.

That is: for an input (1/Rev) signal, of frequency $f_{in}$; and a system clock signal of frequency $f_{clock}$; the M/Rev output signal will be at a frequency, $f_{out}$ equal to $f_{clock}/N$ where:

$$N = f_{clock}/Mf_{in} \tag{36}$$

Thus:

$$f_{out} = Mf_{in} \tag{37}$$

Clearly, quantization error occurs as N and M are restructed to integer values. Nonetheless, the periods of the input and output signals are locked to an integer ratio within the (hardware dependent) precision of the counters 138, 142, and 144. This ratio is re-evaluated and corrected once every cycle of the input signal.

The integer, N, is continuously examined by magnitude comparator, circuit 152. This circuitry verifies that N remains between two pre-established values, say $N_{min}$ and $N_{max}$. This is signified by the Lock output signal.

The comparator circuit, 152, verifies that the input signal remained within a predestined frequency range. In essence, it restricts the lock range to a specific level of precision of counter 144. This permits maintaining output frequency quantization within known error bounds. The counter 144 overflow output signal presented on line 154, is used by this circuit to preclude accepting an "aliased" N value due to the counter 144 exceeding its range and "wrapping around".

Figure 7:
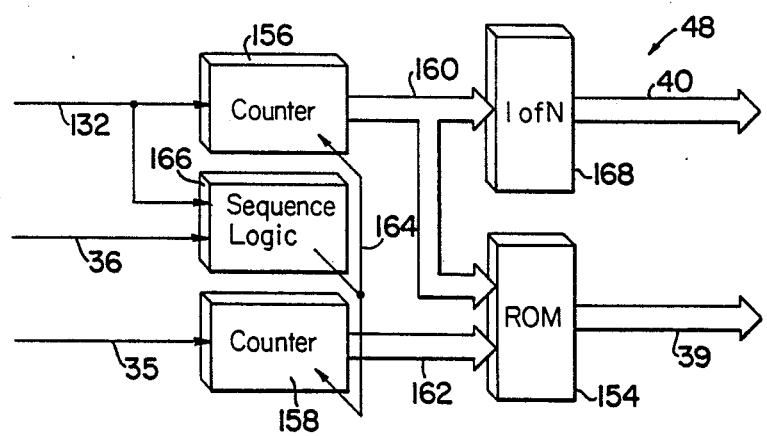
FIG. 7 is a simplified schematic illustration of a period locked loop with phase assertion circuit of the controller of FIG. 1.

FIG. 7 is the simplified schematic illustration of a component synthesizer circuitry 48 of FIG. 1. The System Clock, Assert Phase and M/Rev signals are inputs to the multi-frequency synthesizer. This circuit functions to provide a time-multiplexed series of digital sine and cosine signals at harmonics of the input 1/Rev signal. These are output upon a bit parallel Sine/Cosine Data bus, (39 FIG. 1). Required de-multiplexing information is provided upon a separate Order (n) Select bus, (40, FIG. 1).

The required sine and cosine (or alternative periodic function) signal values are stored in read-only memory (ROM), 154. A total of 2T such function lists are stored therein. Each list contains M sample values describing functions of 1, 2, 3 ... T cycles of oscillation. Each list is stored contiguously. Thus, the "high order" address bits presented to the ROM determine which list is to be accessed. The lists are arranged in ascending harmonic order with alternating cosine and sine functions. Thus, the lowest addressed list is a first order sine and cosine and the highest addressed list is a Tth order sine wave. Within each list, the data is arranged in phase angle (i.e. time) succession. Hence a linear progression of the "low order" address bits presented to the ROM will read out a signal function in sequence. Other storage schemes may be employed without affecting the fundamental logic of the device.

Two counters 156 and 158 form the ROM address. Counter 156 changes at the System Clock rate and forms the $Log_2(2T)$ most significant bits (line 160). Counter 158 forms the remaining least significant bits. These change at a rate of M/Rev (signal on line 35). There are $Log_2(M)$ least significant bits, (line 162).

Counters 156 and 158 are controlled by Sequence Logic circuit 166 which provides control signals on line 164 causing Counter 156 to cycle the High Address bits through the numbers 0 through 2T-1 at the System Clock rate (or a multiple of this rate) for each stable value of the Low Address bit pattern. This circuit sets both counters 156 and 158 to 0 upon each rising edge of the Assert Phase signal.

The actions of circuit elements 156, 158 and 160 cause the ROM to be addressed in an orderly interleaved pattern, providing output code words to the Sine/Cosine Data bus. Bursts of 2T words are output to this bus following each rising edge of M/Rev signal. The 2T data values are rapidly output following each rising edge of the Assert Phase signal. These are alternating cosine and sine values for phase angle equal to 0, sequenced in increasing harmonic order. The bus then remains "quiet" until the next rising edge of M/Rev signal. At this signal rise, the 2T data values associated with phase angle equal to 2TT/M (radians) are output in the same sequence. The data is subsequently output in the same fashion following rise of M/Rev signal. Each such output signal differs in phase angle from its predecessor by 2TTM radians. This sequence continues until the Assert Phase signal causes a reset to 0 phase.

Note that quantization errors in the PLLPA and/or frequency variation in the 1/Rev input signal can lead to reading greater or fewer than M regular data sets per 1/Rev period. Such angular truncation is termed the "closure error" and is discussed hereinafter. The bit patterns of the High Address bus indicate the data present on the Sine/Cosine Data bus. The least significant of these is "high" whenever a cosine signal is presented and "low" when a sine is addressed. This signal is incorporated in the Sine/Cosine Data bus as an "A/B select" signal. The remaining $Log_2(2T) - 1$ bits are subjected to "1 of N" encoding by encoder circuit 168. The "1 of N" encoder converts all but the least significant bit of the High Address bus data from a binary number of T separate signals. One of these is uniquely "high" for each harmonic order addressed; the remainder are "low". These sequentially asserted signals form the Order(n-)Select bus 40.

Figure 8:
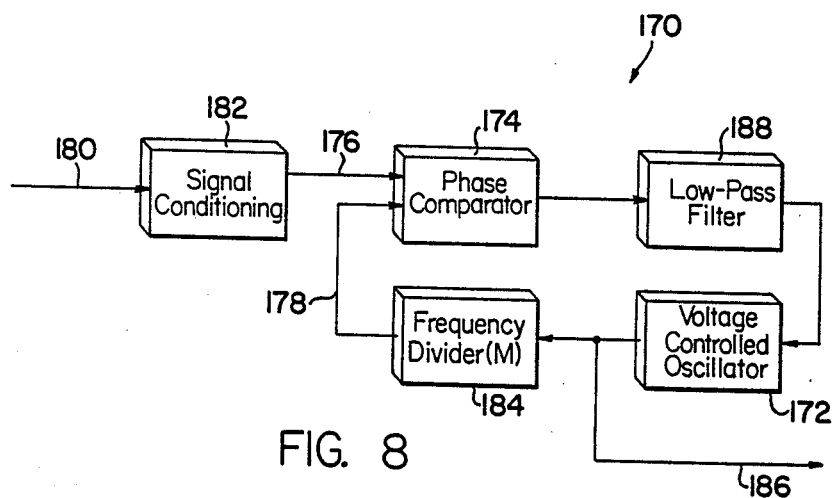
FIG. 8 is a simplified schematic illustration of a prior art phase lock loop circuit.

The PLLPA circuit 34 competes with prior art circuits termed "Phase-locked Loops" (PLL). These perform a similar function but accomplish it by alternate technology. A typical PLL block diagram for frequency multiplication is shown in FIG. 8.

A phase-locked loop circuit 170 contains a voltage controlled oscillator (VCO) 172 which produces a square-wave signal with frequency proportional to its input voltage. This control voltage is produced by the filtered output signal of a phase comparator 174 which outputs a voltage proportional to the phase difference between two signals (normally) of the same frequency applied to its inputs, lines 176, 178. Filtration is required to remove harmonic error content in this signal to provide loop stability. One of the inputs to the phase comparator is the "squared-up" image signal of the input signal to be harmonically multiplied, line 180, from signal conditioning circuitry 182. The second is a frequency divided signal image of the VOC's output provided by frequency divider circuit 184. When the loop obtains lock, this divided frequency is equal to that of the input signal. If a frequency division of M is employed, the frequency of the VOC output signal (line 186) is then M times that of the input.

Some caveats must be noted. Firstly, this type of circuit can lock whenever the two inputs are of harmonically related frequencies. Hence, frequency multiplication by M is not a uniquely possible output. Secondly, the phase between the comparator's inputs is a linear function of frequency unless the low pass filter 188 contains a "free pole" which compromises loop stability. Hence, the multiplied rate signal varies in reference phase M times as rapidly with changes in frequency.

Further, a PLL has no inherent means of ascertaining that it is in lock. It is possible to compare the filtered phase detector's command voltage signal against the extremes of the VOC's compliance but this merely verifies that the VOC has not been driven to an extreme. As an example, such a test will not detect that the VOC is simply "free-running" in the absence of an input.

The present PLLPA circuit solves all of these difficulties and offers several other advantages. Specifically:

(1) The PLLPA circuit does not suffer "harmonic locking".
(2) The PLLPA circuit maintains a constant phase relationship with frequency.
(3) The PLLPA circuit has inherent lock indication.
(4) The "capture" or "acquisition" and "tracking" or "lock" frequency ranges are identical. A PLL will only "capture" a signal within a narrow frequency sub-span of its "tracking" range.
(5) The PLLPA circuit will acquire an exact lock within one cycle of any input within its "lock" range. No known PLL's can achieve this.
(6) The PLLPA circuit is an all digital design with attendent reproducibility, consistency, reliability, simplicity and flexibility. In contrast, PLLs utilize analog as well as digital techniques.

As described hereinabove, the synthesizer circuit section generates sinusoidal waveforms which are spectrally pure to better than 40 db. Moreover, the use of long (2048 value) data tables moves any aliased signal images in the output signal to the 10 khz frequency range, well above the analysis range of the measured signals, and at signal magnitudes which are exceptably low.

The present synthesizer circuit provides digital sinusoid signals which (1) are not converted to analog waveforms and are used to decompose the received data signal into selected Fourier signal components, and (2) are converted to analog waveforms and are used to reconstruct the desired output signal. Unique to the present controller is circuitry which measures the period of the timing signal (the 1/rev. signal), and generates therefrom a selected number of signals during the timing signal period, (2048 signals per period). In addition, the controller provides a forced phase relationship between the synthesized sinusoid signals and the timing signal once per cycle.

The "period locked loop with phase assertion" method and apparatus embodied herein with respect to the preferred embodiment represents a significant advance over more traditional "phase lock loop" circuit technology. Those skilled in the art will note that the present period locked loop circuit is characterized by tracking (or capture) and lock ranges which are equal. Conventional phase lock loop circuits have a capture range which is much narrower than the corresponding lock range. Consequently a phase lock loop circuit requires, in the present application, an unacceptably large number of rotor revolutions before capture is accomplished. Since helicopter blades are operated over a somewhat narrow speed range, the broad lock range provided by conventional phase lock loop circuits is less important. The ability of the present circuit to capture within one revolution is more important, and marks a point of departure of the present invention over the prior art.

Moreover, the present circuit inherently provides a digital error signal that indicates when the circuit is not locked to the timing signal. As noted above, as long as the count code value in counter 148 is within a selected range, the circuit is locked. A count code outside this value results in an error signal. With conventional phase locked loop circuits separate circuitry is required to generate an out of lock error signal.

While the present period locked loop with phased assertion method and apparatus provides significant advantages in the preferred embodiment, those skilled in the art will recognize that the digital synthesizer circuitry can also be synchronized by a high rotor order tachometer signal (e.g. 2048/rev.) rather than a 1/rev. blooper (tachometer) signal. For certain applications, such as the helicopter of FIG. 1, a mechanically generated high order tachometer signal can be configured to provide signal processing and remove the rotor operating speed restrictions, as well as eliminate the need for certain expensive electronics.

Figure 9:
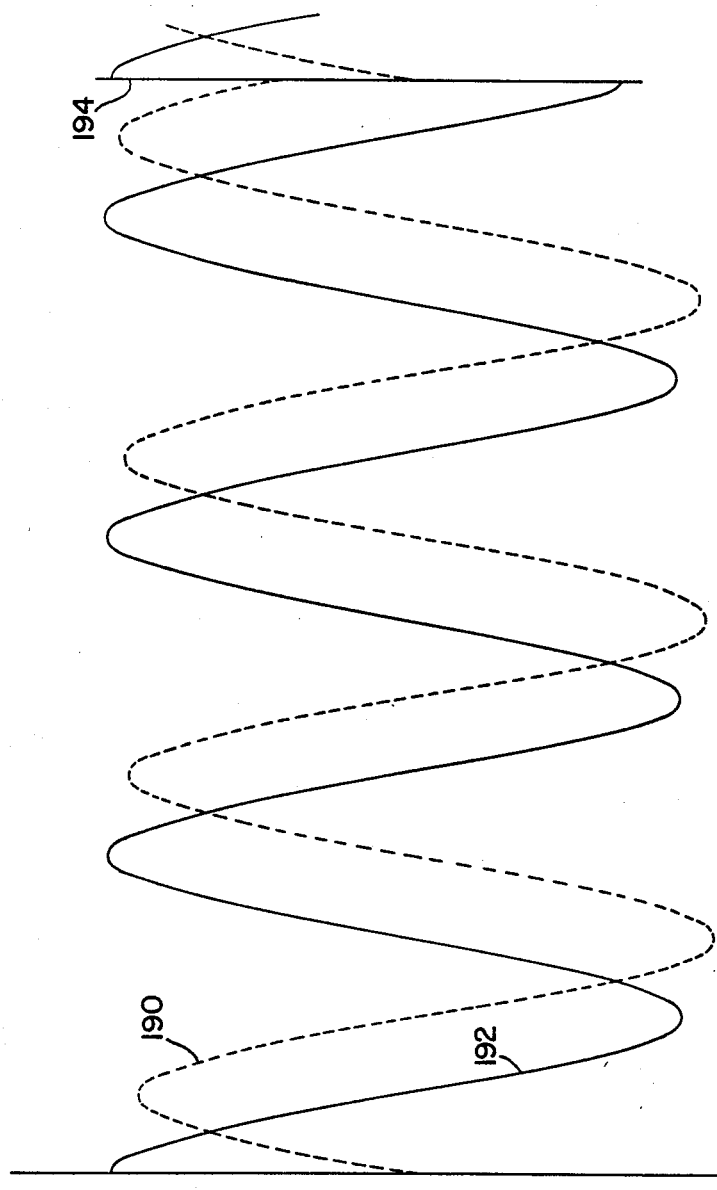
FIG. 9 diagrammatically illustrates the closure phase error in the synthesized tachometer signals generated by the controller of FIG. 1 when a helicopter rotor is overspeed.

The period lock loop with phased assertion circuit generates a 2048/rev. signal from a 1/rev. tachometer signal. Quantization errors or closure phase errors in the synthesized signals are the result. The most serious quantization signal error stems from the fact that tachometer signal frequency can only be validated once per revolution. Curves 190,192 in FIG. 9 illustrate an example of the closure phase error in the synthesized tachometer signals when the helicopter rotor is over-speed. A similar error exists when the rotor is under-speed. The synthesized 4/rev. signal is characterized by an instantaneous discontinuity 194 at the cycle to cycle closure. The difference between actual 1/rev. and the synthesized 1/rev. signals and the corresponding signal harmonics manifests itself as an error angle at the time of synthesized tachometer signal update. This is the closure phase error noted above. Note however that rotor speeds which are over or under the bracketed speed constitute an out of lock condition.

The closure phase error also exists even when the rotor operates at constant speed within the aforementioned rotor speed range. As detailed hereinabove, the period locked loop with phased assertion circuitry generates signals for 32 different rates of angle advance, one for each of the count codes between counts 192 and 223. Consequently, in the preferred embodiment there are 32 precise rates of rotor rotation for which an exact match of angle advance rate and the synthesized (2048/rev.) tachometer signal is possible.

In the preferred embodiment, the period locked loop with phased assertion provides a closure phase error of less than 2 degrees in magnitude for any rotor speed within the lock range. By restricting the count code to counts in the 192 to 223 range any stable rotor speed within the bracketed 274.3 to 318 rpm lock range results in a closure error of 10 address steps or less. Consequently, in the preferred embodiment there is a closure error having a magnitude 1.76 degrees as an upper bound.

During rapid accelerations or decelerations of a helicopter rotor within the 295 to 305 rotor rpm operating range, the digital processor detailed hereinabove displays only an eight step or 1.41 degree closure error for those speed transitions between 295 and 305 rpm which are accomplished in one rotor revolution. With the helicopter rotor operating a constant speed, the closure error is constant and is solely the result of quantized angle advance frequencies in the device. The period locked loop with phased assertion circuitry as described hereinabove is configured so that the period of the synthesized waveforms (and their frequency) is in exact match with that of the rotor regardless of the closure error. This is the direct ramification of the once per turn phase assertion. In the case of an accelerating rotor, the period of the synthesized function signal lags the period of the rotor by one revolution and the closure error remains constant for a constant rate of change of rpm. Phase error at closure increases to direct proportion to the order synthesized, such that a 1.76 degree error in the fundamental frequency (1/rev.) implies a 10.55 degree error in the sixth harmonic (6/rev.) frequency. The synthesizer circuit of the preferred embodiment performs with an overall precision of about 5% for instantaneous values of its output signal over the entire lock rotor speed range.

The HALMARS system detailed hereinabove holometrically characterizes the helicopter rotating system so that only a few strains measured on the helicopter fuselage can yield the rotating strains and bending moments at any locations on the blades and other rotating parts under transient maneuver as well as steady state flight conditions. This calibration is insensitive to gross weight and sensor location. As such, the present invention is a marked improvement over the known art which rely on sensors positioned with the moving components of interest. In the helicopter of FIG. 1 the HALMARS system removes the need to configure the helicopter with strain gauges on the helicopter blades and slip rings for transmission of the sensor signals.

Figure 10:
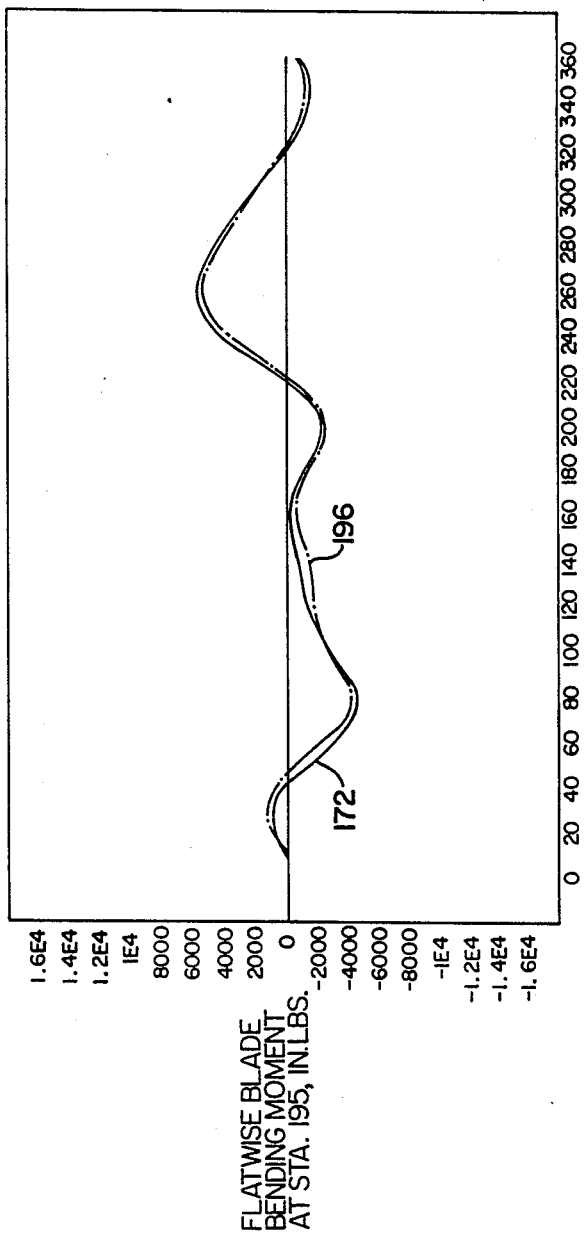
FIG. 10 illustrates measured flatwise blade bending moments on a helicopter blade as compared to blade bending moments computed by the system of FIG. 1.

FIG. 10 compares flatwise blade bending moments on a measured helicopter blade of FIG. 1 to moments computed by the present invention for level flight at a helicopter speed of 130 knots. Curve 196 corresponds to the measured rotating flatwise blade bending moment, while curve 198 corresponds to that blade bending moment determined using the present invention. The HALMARS system provides load signals which were within 5% of actual load for a variety of flight conditions, including steady and level flight maneuver transients at various roll and pitch rates from a 0.48 G pushover to a 2 G pullout at 90 knots, as well as maneuver transients at several pitch and helicopter rolls with rates from a 0.65 G pushover to a 1.59 G pulloff at maximum velocity.

The HALMARS technique detailed hereinabove is not limited in application to helicopters or other aircraft. For example, the above analysis can be readily adapted to determine accelerative loads on rotating turbine blades in gas turbine engines, loads in rotating automobile engine components and dynamic loads on aircraft wings. In sum, the present invention allows for a remote determination of strains and loads with any mechanical system having components which are not amenable to direct, local instrumentation.

Similarly, although the invention has been described hereinabove with respect to a preferred embodiment thereof, it should be understood by those skilled in the art that various changes, omissions and additions thereto may be made therein without departing from the spirit and scope of the invention.

We claim:

1. A method of generating, from a first set of signals measured in a first member indicative of a first member parameter, a relational set of signals substantially equating with said first signal set a second set of signals indicative of said parameter as measured in a cooperative second member, said method comprising the steps of:

measuring a first signal set indicative of a first member parameter by means of sensors directly configured with the first member;

measuring a second signal set by means of sensors directly configured with the second member, said second member measured signal set including signals indicative of said parameter;

Fourier decomposing said first member signal set into signals corresponding to a time independent first member Fourier coefficient signal set therefor;

Fourier decomposing said second member signal set into signals corresponding to a time independent second member Fourier coefficient signal set therefor;

said first and second member Fourier coefficient signal sets corresponding to respective first and second mathematical vectors lying in a vector space with each of said signal sets mathematically configured into respective first and second matrices comprised of elements corresponding to Fourier coefficient signals thereof arranged in rows and columns, computing, from said second member Fourier coefficient signal set a substantially independent signal subset thereof having a plurality of signal elements that substantially spans said mathematical vector space; and generating a relational signal set corresponding to a mathematical pseudo inverse of said first member Fourier coefficient signal set with said substantially independent signal subset.

2. The method of claim 1 wherein the first member rotates relative to the second member.

3. The method of claim 1 wherein said first member Fourier coefficients signal set further comprises a plurality of signal subsets indicative of said first member parameter for a corresponding plurality of flight conditions and wherein said relational and second member Fourier coefficient signal sets further comprise signal subsets of corresponding flight conditions.

4. The method of claim 1 wherein said computing step includes computation steps in accordance with a Jones Euclidian Limit Length Orthogonalization Algorithm that includes the steps of:

assuming a first column of elements of said second member Fourier coefficient signal set to be mathematically independent and comprise said substantially independent signal subset, comparing each element in successive columns of said second member Fourier coefficient signal set with said mathematically independent signal column, and supplementing said independent signal subset with elements of said successive columns which are determined to be substantially mathematically independent from said independent signal subset.

5. The method of claim 4 wherein said computing step further comprises the steps of comparing each of said second member Fourier coefficient signal elements against a pre-selected threshold value indicative of substantial mathematical independence and including each of said elements in said substantially independent signal subset only if said threshold value is at least as great as said element.

6. The method of claim 5 wherein said comparing step further comprises the steps of computing a mathematical dot product of said second member Fourier coefficient signal elements and said substantially independent signal subset.

7. The method of claim 1 wherein said time independent Fourier coefficient signal sets include constant coefficients and coefficients for fundamental and harmonic frequencies thereof, said method further comprising the steps of selecting only particular ones of said Fourier coefficients corrresponding to selected ones of said harmonics frequencies.

8. An apparatus for use in generating, from a first set of signals measured in a first member indicative of a first member parameter, a relational set of signals equating with said first signal set a second set of signals indicative of said parameter as measured in a cooperative second member, said apparatus comprising:
  means directly configured with the first member for measuring a signal set indicative of a first member parameter;
  means directly configured with the second member for measuring a second signal set including signals indicative of said parameter;
  a controller including
  means for Fourier decomposing said first member signal set into signals corresponding to a selected time independent first Fourier coefficient signal set
  means for Fourier decomposing said second member signal set into signals corresponding to a selected time independent second Fourier coefficient signal set;
  said first and second Fourier coefficient signal sets corresponding to respective first and second mathematical vectors lying in a vector space with each of said signal sets mathematically configured into respective first and second matrices comprised of elements corresponding to Fourier coefficient signals thereof arranged in rows and columns,
  said controller for computing, from said second Fourier coefficient signal set, a substantially independent signal subset thereof having a plurality of elements that substantially spans said mathematical vector space, and for generating a relational signal set comprised of a mathematical pseudo inverse of said substantially independent signal subset and said first Fourier coefficient signal set.

9. The apparatus of claim 8 wherein the first member rotates relative to the second member.

10. The apparatus of claim 9 wherein said first Fourier coefficient signal set further comprises a plurality of signal subsets indicative of said first member parameter for a corresponding plurality of flight conditions and wherein said relational and second Fourier coefficient signal sets further comprise signal subsets of corresponding flight conditions.

11. The apparatus of claim 8 wherein the first member vibrates relative to the second member.

12. The apparatus of claim 8 wherein the controller computes the independent signal subset in accordance with a Jones Euclidian Limit Length Orthogonalization Algorithm and includes a means for:
  assuming a first column of said second member Fourier coefficient signal set to be mathematically independent and comprise said independent signal subset,
  comparing each element in successive columns of said second member signal set with said mathematically independent signal column, and
  supplementing said independent signal subset with elements of said successive columns which are determined to be substantially mathematically independent from said independent signal subset.

13. The apparatus of claim 12 wherein said controller further comprises a comparator for comparing each value of Fourier coefficient signal elements against a pre-selected threshold value indicative of substantial mathematical indpendence and including said element in said substantially independent signal subset only if said threshold value is at least as great as said element.

14. An electronic phase synchronization circuit receiving a periodic timing signal having a period and a signal phase, comprising:
  a control signal circuit receiving said periodic timing signals, for generating, during said timing signal period, a selected number of control signals;
  a synthesizer circuit receiving said control signals, for generating in response thereto a plurality of first and second periodic signals, each of said first and second synthesizer periodic signals characterized by a signal phase and a frequency, said control signals selectively enabling said synthesizer circuit to output selected ones of said first and second synthesizer periodic signals; and
  a circuit for adjusting, once per said timing signal period, the phase of said first and second synthesizer periodic signals to equal the phase of said periodic timing signal.

15. The circuit of claim 14 wherein said phase synchronization circuit synchronizes said timing signal and said synthesized periodic signals within a selected frequnecy range, and further provides an error signal when said timing signal is not within said synchronization signal frequency range.

16. The circuit of claim 15 wherein said phase synchronization circuit synchronizes said timing signal and said synthesized periodic signals over a capture frequency range that is equal in magnitude to said synchronization frequency range.

17. The circuit of claim 15 wherein said error signal is inherently digital.

18. The circuit of claim 14 wherein said first and second periodic signals further comprise respective signal harmonics thereof.

19. The circuit of claim 14 wherein said control signal circuit comprises a digital control signal circuit.

20. The circuit of claim 19 wherein said synthesizer circuit comprises a digital erasable programmable memory and multiplying digital/analog converters.

21. The circuit of claim 14 wherein said periodic timing signal is provided by a helicopter rotor rotation sensor.

22. A system for determining a time dependent signal corresponding to a parameter in a first member, said system comprising:

a means for measuring a time dependent signal set in a second member cooperative with said first member including signals indicative of said first member parameter; and a controller, including
- a means for Fourier decomposing said second member signal set into a set of signals corresponding to a selected time independent second member Fourier coefficient signal set therefore;
- a correlating means for generating a computed first member parameter signal set indicative of said first member parameter that combines said second member Fourier coefficient signal set with a signal set of predetermined correlation coefficients generated by computing a mathematical pseudo-inverse of first member Fourier coefficient signal set corresponding to Fourier coefficients of first member parameter signals directly measured in said first member with a signal set corresponding to a substantially independent subset of signals indicative of said first member parameter directly measured in said second member, said first and second member Fourier coefficient signal sets corresponding to respective first and second mathematical vectors lying in a vector space with each of said signal sets mathematically configured into respective first and second matrices comprised of elements corresponding to signals thereof arranged in rows and columns; and
- a means for generating from periodic signals and said computed first member parameter signal set a time dependent signal indicative of said first member parameter.

23. The system of claim 22 wherein said controller is configured to operate in real time.

24. The system of claim 22 wherein said controller further comprises:
- a control signal circuit receiving a periodic timing signal having a signal phase, for generating, during said external timing signal period a selected number of control signals,
- a synthesizer circuit receiving said control signals, for generating a plurality of first and second periodic signals each having a phase, said control signals selectively enabling said synthesizer circuit to output selected first and second periodic signals; and
- a circuit for adjusting, once per timing signal period, the phase of said first and second synthesized periodic signals to equal the phase of said periodic timing signal.

25. The system of claim 24 wherein said controller synchronizes said timing signal and said synthesized periodic signals within a selected periodic signal range and wherein said controller further provides an error signal when said timing signal is not within said periodic signal range.

26. The system of claim 22 wherein said correlation means further comprises a signal filter means for receiving said measured signals and said synthesized first and second periodic signals, and providing therefrom only a selected Fourier coefficient signal component of the measured signals.

27. The system of claim 26 wherein said correlation means further comprises a coefficient module, receiving the Fourier coefficient signal set, for providing signal multiplication with signals corresponding to said correlation coefficients.

28. The system of claim 27 wherein said first and second synthesized periodic signals further comprises respective signal harmonics thereof.

29. The system of claim 28 wherein said signal generation means further comprises a multiplying resolver circuit, receiving the correlated signals from said coefficient module and said first and second synthesized periodic signals, said multiplying resolver circuit for reconstructing, from said received signals, time dependent signals corresponding to said first member parameter.

30. The system of claim 29 wherein said signal generation means further comprises an analog signal summer circuit, for receiving the time dependent signal components from said multiplying resolver circuit, and outputting a summed, time dependent signal corresponding to the first member parameter.

31. A method for use in determining values of a physical parameter in a first member, comprising the steps of:
- measuring a time dependent signal set in a second member cooperative with said first member including signals indicative of said first member parameter;
- Fourier decomposing said second member signal set into a set of signals corresponding to selected time independent second member Fourier coefficeint signal set therefor;
- generating a computed first member parameter signal set indicative of said first member parameter that combines said second member Fourier coefficient signal set with predetermined correlation coefficients generated by computing a mathematical pseudo-inverse of a first member Fourier coefficient signal set corresponding to Fourier coefficients of first member parameter signals directly measured in said first member with a signal set corresponding to a substantially independent subset of signals indicative of said first member parameter directly measured in said second member, said first and second member Fourier coefficient signal sets corresponding to respective first and second mathematical vectors lying in a vector space with each of said signal sets mathematically configured into respective first and second matrices comprised of elements corresponding to signals thereof arranged in rows and columns; and
- generating from periodic signals and said computed first member parameter signal set a time dependent signal corresponding to said first member parameter.

32. An apparatus for use in generating, from a first set of signals measured in a first member indicative of a first member parameter, a relational set of signals equating with said first signal set a second set of signals indicative of said parameter as measured in a cooperative second member, said apparatus comprising:
- a means directly configured with the first member for measuring a first member signal set indicative of a first member parameter;
- a means directly configured with the second member for measuring a second member signal set including signals indicative of said parameter;
- a controller including
  - a means for transforming said first member signal set into signals corresponding to a selected time independent first coefficient signal set,
  - a means for transforming said second member signal set into signals corresponding to a selected time independent second coefficient signal set;

said first and second coefficient signal sets corresponding to respective first and second mathematical vectors lying in a vector space with each of said signal sets mathematically configured into respective first and second matrices comprised of elements corresponding to coefficient signals thereof arranged in rows and columns, said controller for computing, from said second coefficient signal set, a substantially independent signal subset thereof having a plurality of elements that substantially spans said mathematical vector space, and for generating a relational signal set comprised of a mathematical pseudo inverse of said substantially independent signal subset and said first coefficient signal set.

* * * * *

UNITED STATES PATENT AND TRADEMARK OFFICE
CERTIFICATE OF CORRECTION

PATENT NO. : 4,894,787
DATED : January 16, 1990
INVENTOR(S) : William G. Flannelly; Clifford T. Gunsallus; and George F. Lang It is certified that error appears in the above-identified patent and that said Letters Patent is hereby corrected as shown below:

Column 1

Line 54, after "more" insert --difficult--.

Line 67, delete "reeal" and substitute --real--.

Column 2

Line 35, delete "signal. A control" and substitute --signal a control--.

Column 3

Line 18, delete "Sysem" and substitute --System--.

Column 4

Line 6, delete "guite" and substitute --quite--.
Line 35, after "e.g." insert --,--.
In Equation 1, delete "CxR Cx(LxH) (LxH)xR CxR"

UNITED STATES PATENT AND TRADEMARK OFFICE
CERTIFICATE OF CORRECTION

PATENT NO. : 4,894,787
DATED : January 16, 1990
INVENTOR(S) : William G. Flannelly, et al.

It is certified that error appears in the above-identified patent and that said Letters Patent is hereby corrected as shown below:

Column 5

Equation 2 should read--

$$K^T_{N,J=1} K_{N,J+1} = \begin{bmatrix} [K^T_{NJ} K_{NJ}] & \{K^T_{NJ} k_{j+1}\} \\ \hline [k^T_{j+1} K_{NJ}] & k^T_{j+1} k_{j+1} \end{bmatrix}$$

Line 37, delete "$k^O_{j+1}$" and substitute --$k^{(o)}_{j+1}$--.

Equation 3 should read--

$$k^{(o)}_{j+1} \stackrel{\Delta}{=} K_{N,J}C = k_{j+1} + e$$ --.

Column 6

Line 24, delete "$K^O_{j+1}$" and substitute --$k^{(o)}_{j+1}$--.

Line 26, delete "$k^O_{j+1}$" and substitute --$k^{(o)}_{j+1}$--.

Line 28, delete "$K^O_{j+1} K^O_{J+1}$" and substitute --$k^{(o)}_{j+1} k^{(o)}_{j+1}$--.

Line 30, after "angle" insert --$\alpha$--.

Line 31, after "the" delete "$\alpha$" and substitute --$\alpha$--.

Line 31, after "Sin²" delete "$\alpha^2$" and substitute --$\alpha$--.

In Equation 12 please delete "sin²X" and substitute --$\sin^2 \alpha$--.

UNITED STATES PATENT AND TRADEMARK OFFICE
CERTIFICATE OF CORRECTION

PATENT NO. : 4,894,787
DATED : January 16, 1990
INVENTOR(S) : William G. Flannelly; Clifford T. Gunsallus; and George F. Lang It is certified that error appears in the above-identified patent and that said Letters Patent is hereby corrected as shown below:

Column 6

Line 40, delete "$sin^2$" and substitute --$sine^2$--.
Line 41, delete "$\alpha$" and substitute --$\alpha$--.

Column 8

Line 47, delete "movement" and substitute --moment--.

Column 12

Line 12, delete "the" and substitute --The--.

Equation 17 should read--

$V_{U4p14} = V_{U1p8} * (Code_A - 128)/128$--.

Column 15

Equation 33 should read--

$V_{U8p14} = -Bn * SIN(np)$--.

Equation 34 should read--

$V_{J3p8} = V_{U8p1} = Vn(t) = An * COS(np) + Bn * SIN(np)$--.

UNITED STATES PATENT AND TRADEMARK OFFICE
CERTIFICATE OF CORRECTION

PATENT NO. : 4,894,787

DATED : January 16, 1990

INVENTOR(S) : William G. Flannelly, et al.

It is certified that error appears in the above-identified patent and that said Letters Patent is hereby corrected as shown below:

Column 15

Line 43, after "with:" insert Equation 35--

$$V_{U10p1} = -V(t) = -Rp7 * \sum_{n=1}^{6} [Yn(t)/Rpn] --.$$

Signed and Sealed this

Seventh Day of January, 1992

*Attest:*

HARRY F. MANBECK, JR.

*Attesting Officer*      *Commissioner of Patents and Trademarks*